United States Patent
Ouyang (10) Patent No.: US 10,455,338 B2
(45) Date of Patent: Oct. 22, 2019

(54) METHOD AND APPARATUS FOR REMOVING DUST IN SOUND OUTLET HOLE OF LOUDSPEAKER AND TERMINAL DEVICE

(71) Applicant: GUANGDONG OPPO MOBILE TELECOMMUNICATIONS CORP., LTD., Dongguan, Guangdong (CN)

(72) Inventor: Ling Ouyang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/868,267

(22) Filed: Jan. 11, 2018

(65) Prior Publication Data
US 2018/0255412 A1 Sep. 6, 2018

(30) Foreign Application Priority Data

Mar. 3, 2017 (CN) .......................... 2017 1 0123445

(51) Int. Cl.
| | |
|---|---|
| *B08B 7/02* | (2006.01) |
| *H04R 29/00* | (2006.01) |
| *H04R 3/00* | (2006.01) |
| *G06F 3/0484* | (2013.01) |
| *H04R 3/04* | (2006.01) |

(52) U.S. Cl.
CPC ........... *H04R 29/001* (2013.01); *B08B 7/026* (2013.01); *G06F 3/0484* (2013.01); *H04R 3/00* (2013.01); *H04R 3/04* (2013.01); *H04R 2400/00* (2013.01)

(58) Field of Classification Search
CPC . H04R 19/04; H04R 1/02; H04R 1/42; H04R 29/001; H04R 3/00; H04R 3/04; H04R 9/02; A61B 5/12; B08B 7/026; B08B 7/028; B08B 7/02; B01D 46/0076
USPC ....................................... 381/58, 74, 59, 150
See application file for complete search history.

(56) References Cited

U.S. PATENT DOCUMENTS

| | | | |
|---|---|---|---|
| 10,124,772 B1 * | 11/2018 | Hartman | ................... B08B 7/02 |
| 2002/0184189 A1 * | 12/2002 | Hay | ....................... G06Q 30/06 |
| 2004/0062404 A1 | 4/2004 | Negishi et al. | |

(Continued)

FOREIGN PATENT DOCUMENTS

| | | |
|---|---|---|
| CN | 200967051 Y | 10/2007 |
| CN | 202799119 U | 3/2013 |

(Continued)

OTHER PUBLICATIONS

Extended European search report issued in corresponding European application No. 18152007.3 dated Sep. 7, 2018.

(Continued)

*Primary Examiner* — Vivian C Chin
*Assistant Examiner* — Ubachukwu A Odunukwe
(74) *Attorney, Agent, or Firm* — Young Basile Hanlon & MacFarlane, P.C.

(57) ABSTRACT

A method and an apparatus for removing dust in a sound outlet hole of a loudspeaker and a terminal device are disclosed. The method includes reading a prestored audio frequency for removing dust; and playing the audio file for removing dust. When the loudspeaker plays the audio file for removing dust, a wind speed in the sound outlet hole is at a maximum.

12 Claims, 6 Drawing Sheets

(56) References Cited

U.S. PATENT DOCUMENTS

2008/0085018 A1* 4/2008 Troxell ............ B01D 46/0076
381/150
2015/0304786 A1* 10/2015 Partio ................ H04R 25/305
381/58
2017/0059263 A1* 3/2017 Sun .................... H05K 7/20181

FOREIGN PATENT DOCUMENTS

| CN | 103501375 | A |   | 1/2014  |         |          |
|----|-----------|---|---|---------|---------|----------|
| CN | 203446017 |   | * | 2/2014  | ....... | H04R 9/02|
| CN | 203446017 | U |   | 2/2014  |         |          |
| CN | 203687065 | U |   | 7/2014  |         |          |
| CN | 105103568 | A |   | 11/2015 |         |          |
| CN | 105149297 | A |   | 12/2015 |         |          |
| CN | 205545921 | U |   | 8/2016  |         |          |
| CN | 106878880 | A |   | 6/2017  |         |          |
| JP | 2011146842| A |   | 7/2011  |         |          |
| JP | 2014233703|   | * | 12/2014 | ....... | H04R 3/00|

OTHER PUBLICATIONS

Anonymous, Removing dust in speaker grills, XP055495499, Nov. 12, 2015.
Anonymous, Review: Altec Lansing XA3021 speaker system, XP055495509, Dec. 3, 2011.
Unknown: "How to Clean Android Phone Speakers with an App", Dec. 20, 2016 (Dec. 20, 2016), XP055601584, Retrieved from the Internet: URL :https://web.archive.org/web/20161220090703/https://www.technologysage.com/2016/11/clean-android-phonespeakers-with-an-app. html [retrieved on Jul. 2, 2019) .
Anonymous: "So You Got Water in Your iPhone 7/7+ Speaker and You Want to Get it Out! : iphone",, Dec. 8, 2016 (Dec. 8, 2016), pp. 1-2, XP055601444, Retrieved from the Internet: URL:https://www.reddit.com/r/iphone/comments/5h5kkv/so_you_got_water_in_your_iphone_77 speaker_and/ [retrieved on Jul. 2, 2019].
Office Action 1 issued in corresponding European application No. 18152007.3 dated Jul. 10, 2019.

* cited by examiner

METHOD AND APPARATUS FOR REMOVING DUST IN SOUND OUTLET HOLE OF LOUDSPEAKER AND TERMINAL DEVICE

BACKGROUND

Field

The present disclosure relates to a field of electronic devices, and more particularly to a method and an apparatus for removing dust in a sound outlet hole of a loudspeaker and a terminal device.

Background

In a terminal device, for example, a mobile phone or a tablet computer, a sound unit of a loudspeaker is usually disposed inside the terminal device and generates sound to outside from the terminal device via a sound channel. A dust cloth usually covers a position of a sound outlet hole to prevent sound quality from being affected by dust in the environment from entering an interior of the terminal device via the sound channel. However, when the dust cloth is used, the dust is easily deposited on the dust cloth, so that the area of the sound outlet hole of the sound channel is decreased. Accordingly, volume of the loudspeaker is small, and even noise occurs.

In the prior art, a user needs to clean the dust cloth at the position of the sound outlet hole manually. In special circumstances, it is necessary to take the terminal device to a service station, where the dust on the dust cloth may be removed manually only when the terminal device is disassembled. As a result, it is not convenient to remove the dust in the sound outlet hole of the loudspeaker.

BRIEF DESCRIPTION OF THE DRAWINGS

Advantages of the present disclosure will be apparent and understood easily from the description in conjunction with embodiments of the following drawings.

DETAILED DESCRIPTION OF ILLUSTRATED EMBODIMENTS

Hereinafter, exemplary embodiments of the present disclosure will be described with reference to the accompanying drawings. The same or similar elements or the elements with the same or similar functions will be designated by the same or similar reference numerals throughout the following description and drawings. The following embodiments described with the accompanying drawings are merely exemplary to explain the present disclosure and not to be construed as limiting the present disclosure.

A method and an apparatus for removing dust in a sound outlet hole of a loudspeaker and a terminal device in accordance with embodiments of the present disclosure will be described with reference to the accompanying drawings.

Figure 1:
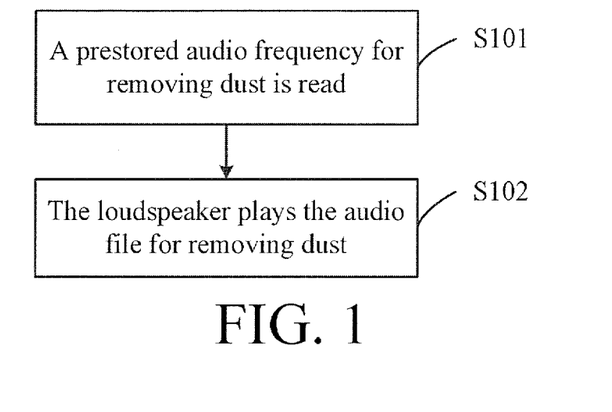
FIG. 1 illustrates a flowchart of a method for removing dust in a sound outlet hole of a loudspeaker in accordance with an embodiment of the present disclosure.

FIG. 1 illustrates a flowchart of a method for removing dust in a sound outlet hole of a loudspeaker in accordance with an embodiment of the present disclosure. As shown in FIG. 1, the method includes the following operations.

At block S101, a prestored audio frequency for removing dust is read.

In detail, the audio file for removing dust may be stored in a memory of a terminal device. As a possible implementation, a user may download, in advance, the audio file for removing dust from a specified server via a specific application in the terminal device. As another possible implementation, the audio file for removing dust may be included in an operating system of the terminal device. In the present embodiment, the method of acquiring the audio file for removing dust is not limited.

It is necessary to generate the audio file for removing dust first before the prestored audio file for removing dust is read. In detail, there are several methods for generating the audio file for removing dust.

As a possible implementation, a natural frequency of the terminal device may be tested. The audio file for removing dust is generated according to the natural frequency.

In detail, in a preset current value, exciting currents having various frequencies are inputted to a coil of the loudspeaker to drive a vibration diaphragm of the loudspeaker to vibrate. Air flow is generated (i.e., a wind speed is generated) in the sound outlet hole under the driving of the vibration diaphragm. When a vibration amplitude is at a maximum, the wind speed in the sound outlet hole is at a maximum. A frequency of the loudspeaker is set as the natural frequency. The natural frequency is generated when the vibration amplitude of the vibration diaphragm excited by a current is at a maximum. An audio file for removing dust at the natural frequency is generated according to the current at the natural frequency, and a sound intensity at the natural frequency is set as a preset intensity. A mono-audio file with preset playing length for removing dust is generated according to the natural frequency and the preset sound intensity.

It is noted that because there are slight structural differences among loudspeakers of various terminal device, there are slight differences among tested natural frequencies of the loudspeakers of the terminal devices. Accordingly, testing may be performed to several terminal devices having the same model. Then, test results are averaged to acquire the natural frequency of the loudspeaker within the terminal devices having the same model.

As another possible implementation, test audio signals may be generated by sounds having different frequencies. The test audio signals are played by the loudspeaker of the terminal device, to acquire the wind speeds in the sound outlet hole when the sounds having different frequencies are played. A frequency corresponding to the test audio signal, which is played when the wind speed is at a maximum in the sound outlet hole, is selected. The audio file for removing dust is generated according to the selected frequency.

It is noted that file formats of the audio file for removing dust may have various forms. For example, the file formats may include but not limited to .mp3 or .wave format. In the present embodiment, values of the sound intensity and the playing length of the audio file for removing dust are not limited.

It may detect whether the sound outlet hole of the loudspeaker is blocked. When the loudspeaker is blocked, a dust removal interface is displayed on a display of a terminal device to acquire a dust removal instruction of a user and to read the prestored audio file for removing dust. The terminal device includes the loudspeaker.

At block S102, the loudspeaker plays the audio file for removing dust.

When the loudspeaker plays the audio file for removing dust, the wind speed in the sound outlet hole is at a maximum.

In detail, when the loudspeaker plays the audio file for removing dust, a maximum wind speed is generated in the sound outlet hole, thereby removing foreign bodies (e.g., liquid or dust) attached to an opening of the sound outlet hole of the loudspeaker.

After the loudspeaker plays the audio file for removing dust at block S102, it may be determined whether the sound outlet hole of the loudspeaker is blocked again. When the sound outlet hole of the loudspeaker is blocked, the user is prompted that it is necessary to send the loudspeaker to a service station to be repaired.

Figure 2:
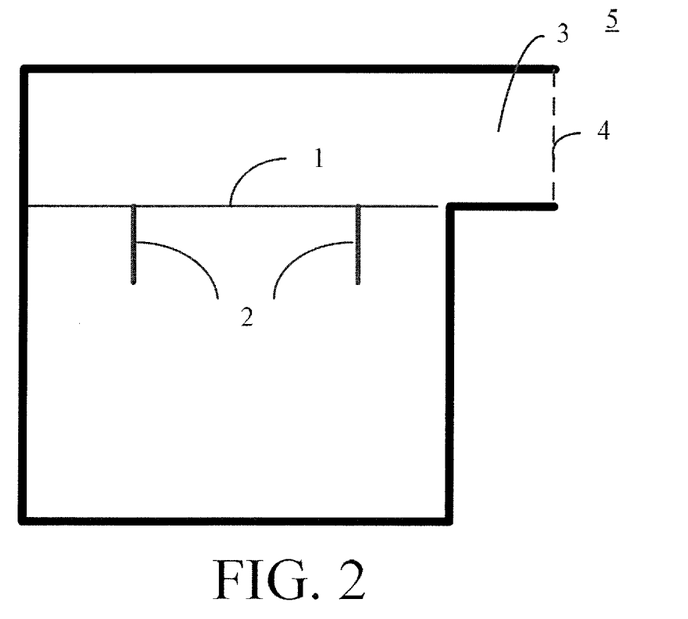
FIG. 2 illustrates a structural diagram of the loudspeaker of a terminal device.

The method provided by the present embodiment may be specifically used to remove dust in a loudspeaker of a terminal device. FIG. 2 illustrates a structure of a loudspeaker 5 of a terminal device. As shown in FIG. 2, the loudspeaker 5 includes a vibration diaphragm 1, a coil 2, and a sound outlet hole 3. A dust cloth is attached in an opening of the sound outlet hole 3.

As a possible application scenario, the method provided by the present embodiment may be used to remove dust in the lateral sound loudspeaker 5 as shown in FIG. 2. In detail, the sound outlet hole 3 is mostly disposed at one side of the bottom of the terminal device. That is, a difference between the lateral sound loudspeaker 5 and a front sound loudspeaker is that air flow from sound is larger in the lateral sound loudspeaker 5. Accordingly, when foreign bodies (e.g., liquid or dust) attached to the dust cloth 4 block the sound outlet hole 3 in the lateral sound loudspeaker 5, the dust cloth 4 may be clean automatically without disassembling the lateral sound loudspeaker 5 by the method provided by the present embodiment.

For the sake of understanding, a principle for removing dust in the sound outlet hole will be introduced briefly as follows.

In the simplified structure of the loudspeaker in FIG. 2, when a vibration frequency of the vibration diaphragm 1 of the lateral sound loudspeaker 5 is a low resonant frequency $f_0$, a vibration speed of each vibrator of the vibration diaphragm 1 is at a maximum. A wind speed in the sound outlet hole 3 of the lateral sound loudspeaker 5 is at a maximum because the vibration speed of each vibrator of the vibration diaphragm 1 is at a maximum.

Since the vibration frequency of the vibration diaphragm 1 of the lateral sound loudspeaker 5 is the low resonant frequency $f_0$ (i.e., a natural frequency of the lateral sound loudspeaker 5), the vibration speed of each vibrator of the vibration diaphragm 1 is at a maximum. Moreover, a vibration frequency of the vibration diaphragm 1 of the lateral sound loudspeaker 5 is decided by a frequency of an exciting current flowing through the coil 2. As such, when the frequency of the exciting current (signals of the exciting current having a single frequency) inputted to the coil 2 is $f_0$, the vibration frequency of the vibration diaphragm 1 of the lateral sound loudspeaker 5 is the natural frequency $f_0$ of the lateral sound loudspeaker 5. The wind speed in the sound outlet hole 3 of the lateral sound loudspeaker 5 is at a maximum.

In the present embodiment, the wind speed in the sound outlet hole 3 of the lateral sound loudspeaker 5 may be at a maximum by reading the prestored audio file for removing dust and playing the audio file for removing dust via the lateral sound loudspeaker 5. As such, the dust deposited in the position of the dust cloth is blown by the air flow, and the manual cleaning process of a user can be avoided, thereby solving the technical problem that the method for removing dust in the sound outlet hole of the loudspeaker is not convenient in the prior art.

Figure 3:
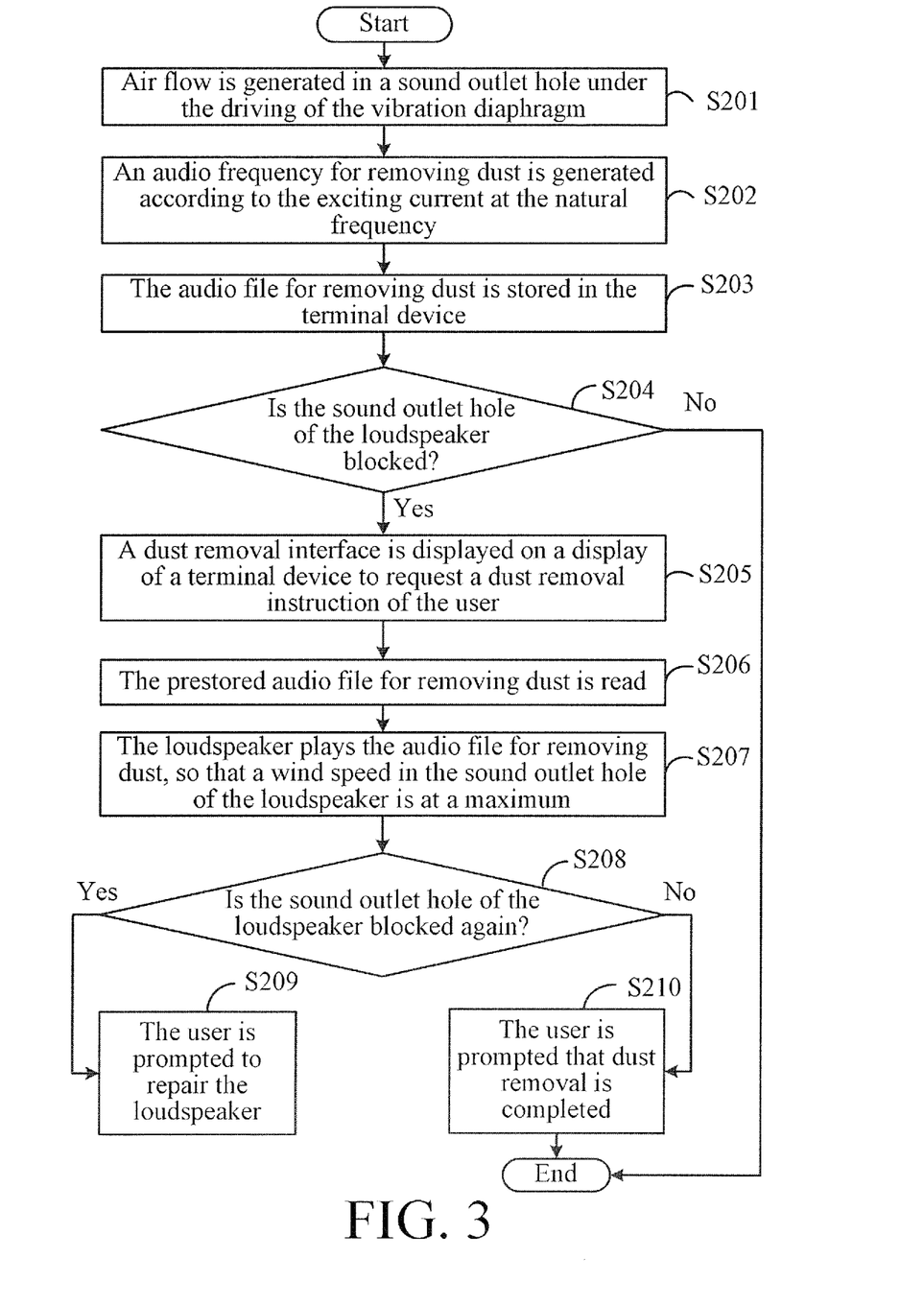
FIG. 3 illustrates a flowchart of a method for removing dust in the sound outlet hole of the loudspeaker in accordance with another embodiment of the present disclosure.

FIG. 3 illustrates a flowchart of a method for removing dust in a sound outlet hole of a loudspeaker in accordance with another embodiment of the present disclosure. The method provided by the present embodiment may be performed by a terminal device. The terminal device includes a loudspeaker. A specific structure of the loudspeaker can be referred to FIG. 2. As shown in FIG. 3, the method includes the following operations.

At block S201, in a preset current value, exciting currents with various frequencies are inputted to a coil of the loudspeaker to drive a vibration diaphragm of the loudspeaker to vibrate. Air flow is generated in a sound outlet hole under the driving of the vibration diaphragm.

In detail, the inner structure of the loudspeaker is shown as FIG. 2. The exciting currents with various frequencies are inputted to the coil 2 in FIG. 2. When the values of the exciting current applied to the coil 2 is larger, a vibration amplitude of the vibration diaphragm 1 is larger. Accordingly, the preset current value may be set as a maximum current that the coil 2 of the loudspeaker can bear. In the present embodiment, a ratio of an effective current to a total current is represented as a value of the exciting current. When the ratio of the effective current to the total current is 1, the value of the exciting value may be represented as 0 dB. Based on this, the preset current may be set as 0 dB, that is, the maximum current.

At block S202, a frequency of the exciting current, which is inputted to the coil when the vibration amplitude of the vibration diaphragm is at a maximum, is set as a natural frequency. An audio frequency for removing dust is generated according to the exciting current at the natural frequency.

In detail, when the frequency of the exiting current inputted to the coil is the natural frequency of the loudspeaker, resonance occurs in the vibration diaphragm and the vibration amplitude of the vibration diaphragm is at a maximum. As such, the frequency of the exciting current, which is inputted to the coil when the vibration amplitude of the vibration diaphragm is at a maximum, is set as the natural frequency. The natural frequency is set as a frequency of the audio file for removing dust, and a sound intensity of the audio file for removing dust is set as a preset decibel value. The audio file for removing dust with a mono-audio frequency having a playing length is generated according to the natural frequency and the preset sound intensity. For example, the sound intensity of the audio file for removing dust may be set as 0 dB. The preset length may be set as 10 seconds.

Ab block S203, the audio file for removing dust is stored in the terminal device.

At block S204, it is determined whether the sound outlet hole of the loudspeaker is blocked. Block S205 is performed if yes. The method ends if no.

Optionally, the terminal device may display a detection interface on the display of the terminal device for detecting whether the sound outlet hole of the loudspeaker is blocked. A control is shown in the detection interface for a user to click to select whether the detection requires being performed. When the user determines to detect whether the sound outlet hole of the loudspeaker is blocked, prompting information may be displayed on the display of the terminal device in a pop-up form to prompt the user not to block the sound outlet hole of the loudspeaker by his/her hand. This can avoid that a misjudgment occurs in a detection result. When the detection is finished, the detection result is displayed in the detection interface.

There are many specific implementation methods for detecting whether the sound outlet hole of the loudspeaker is blocked. As a possible implementation method, an exciting current for a hole blocking test is inputted to the coil to test the vibration amplitude of the vibration diaphragm of the loudspeaker. When the vibration amplitude does not reach an amplitude value corresponding to the exciting current for the hole blocking test, it is determined that the sound outlet hole of the loudspeaker has been blocked.

It is noted that the above-mentioned method for detecting whether the sound outlet hole of the loudspeaker is blocked is based on the vibration amplitude of the vibration diaphragm. Those skilled in the art can appreciate that in practical application, any other methods may be used for detecting whether the sound outlet hole of the loudspeaker is blocked. The method for detecting whether the sound outlet hole of the loudspeaker is blocked is not limited in the present embodiment.

At block S205, when the sound outlet hole of the loudspeaker is blocked, a dust removal interface is displayed on a display of a terminal device to request a dust removal instruction of the user. The terminal device includes the loudspeaker.

Optionally, when the sound outlet hole of the loudspeaker is blocked, the terminal device may display the dust removal interface for removing dust on the display of the terminal device. A control is displayed in the dust removal interface for the user to click to select whether removing dust requires to be performed. When the user determines that removing dust requires to be performed, the dust removal instruction of the user is acquired.

At block S206, when the dust removal instruction of the user is acquired, the prestored audio file for removing dust is read.

At block S207, the loudspeaker plays the audio file for removing dust, so that a wind speed in the sound outlet hole of the loudspeaker is at a maximum.

Optionally, since larger noises probably occur when the loudspeaker plays the audio file for removing dust, it may prompt necessary protection for the ears of the user before the loudspeaker plays the audio file for removing dust.

At block S208, it is detected whether the sound outlet hole of the loudspeaker is blocked again. Block S209 is performed if yes. Block S210 is performed if no.

The method for detecting whether the sound outlet hole of the loudspeaker is blocked may be referred to block S204 in detail and is not repeated herein.

At block S209, when the sound outlet hole remains in a blocked state, the user is prompted to repair the loudspeaker.

When the sound outlet hole still remains in the blocked state after the loudspeaker plays the audio file for removing dust, the user needs to send the terminal device to the a service station, thereby removing dust in the dust cloth manually after the loudspeaker is disassembled.

At block S210, when the sound outlet hole is unblocked, the user is prompted that dust removal is completed.

In the present embodiment, the wind speed in the sound outlet hole of the loudspeaker may be at a maximum by reading the prestored audio file for removing dust and playing the audio file for removing dust via the loudspeaker. As such, the dust deposited in the position of the dust cloth is blown by the air flow, and the manual cleaning process of a user can be avoided, thereby solving the technical problem that the method for removing dust in the sound outlet hole of the loudspeaker is not convenient in the prior art.

Figure 4:
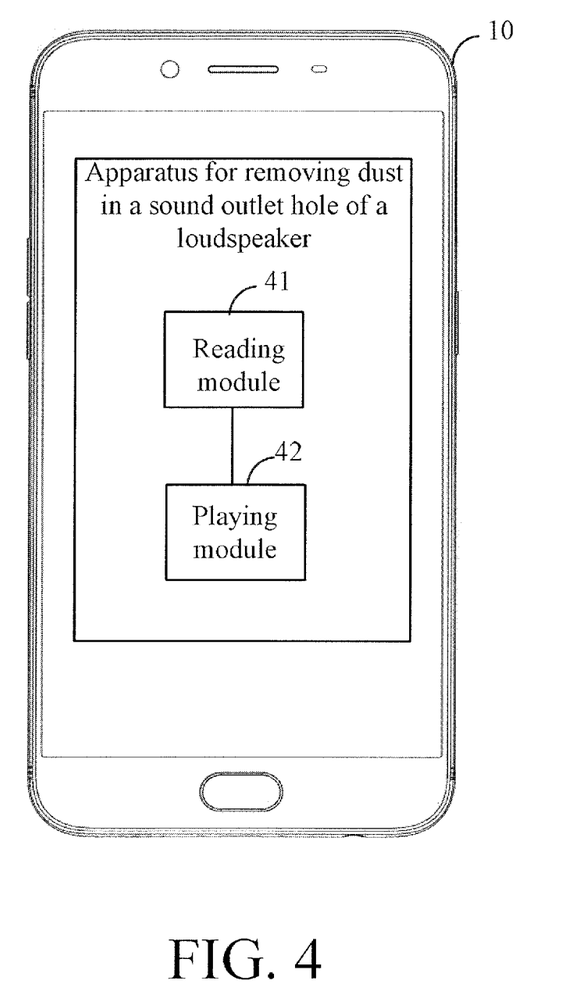
FIG. 4 illustrates a structural diagram of an apparatus for removing dust in the sound outlet hole of the loudspeaker in the terminal device in accordance with an embodiment of the present disclosure.

To implement the above-mentioned embodiments, the present disclosure provides an apparatus for removing dust in a sound outlet hole of a loudspeaker. FIG. 4 illustrates a structural diagram of an apparatus for removing dust in a sound outlet hole of a loudspeaker in a terminal device 10 in accordance with an embodiment of the present disclosure. As shown in FIG. 4, the apparatus for removing dust in the sound outlet hole of the loudspeaker includes a reading module 41 and a playing module 42.

The reading module 41 is configured to read a prestored audio frequency for removing dust.

In detail, the prestored audio file for removing dust is generated according to an audio frequency at which the loudspeaker plays when a wind speed in the sound outlet hole of the loudspeaker is at a maximum. When a dust removal instruction is acquired, the prestored audio file for removing dust is read.

The playing module 42 is configured to play the prestored audio file for removing dust. When the loudspeaker plays the audio file for removing dust, the wind speed through the sound outlet hole of the loudspeaker is at a maximum.

The apparatus for removing dust in the sound outlet hole of the loudspeaker in accordance with the present embodiment includes the reading module configured to read a prestored audio frequency for removing dust, and the playing module configured to play the audio file for removing dust. When the loudspeaker plays the audio file for removing dust, the wind speed through the sound outlet hole of the loudspeaker is at a maximum. After the prestored audio file for removing dust is read, the loudspeaker plays the audio file for removing dust, so that the wind speed in the sound outlet hole of the loudspeaker is at a maximum by. As such, the dust deposited in the position of a dust cloth is blown by the air flow, and the manual cleaning process of a user can be avoided, thereby solving the technical problem that the method for removing dust in the sound outlet hole of the loudspeaker is not convenient in the prior art.

It is noted that the descriptions of the methods in accordance with above-mentioned embodiments are also applied to the device in accordance with the embodiment of the present disclosure. The implementation principles of the methods are similar to those of the apparatus and not repeated herein.

Figure 5:
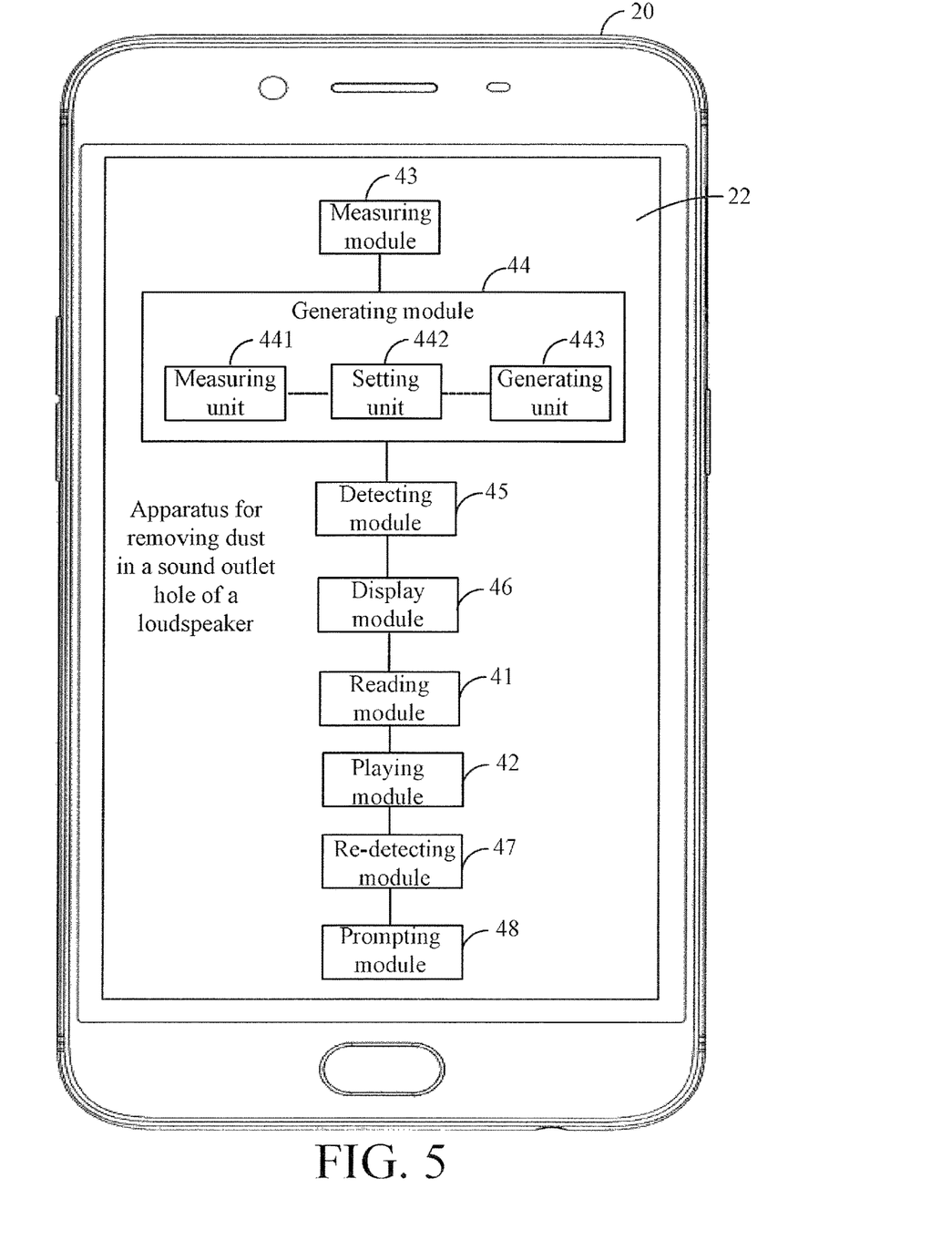
FIG. 5 illustrates a structural diagram of an apparatus for removing dust in the sound outlet hole of the loudspeaker in the terminal device in accordance with another embodiment of the present disclosure.

FIG. 5 illustrates a structural diagram of an apparatus for removing dust in a sound outlet hole of a loudspeaker in a terminal device 20 in accordance with another embodiment of the present disclosure. As shown in FIG. 5, the apparatus for removing dust in the sound outlet hole of the loudspeaker may include a measuring module 43, a generating module 44, a detecting module 45, a display module 46, a re-detecting module 47, and a prompting module 48.

The measuring module 43 is configured to drive a vibration diaphragm of the loudspeaker to vibrate at a natural frequency.

The generating module 44 is configured to generate an audio frequency for removing dust according to vibration of a vibration diaphragm of the loudspeaker at the natural frequency.

In detail, the generating module 44 is configured to set a frequency of the audio file for removing dust as the natural frequency, set a sound intensity of the audio file for removing dust as a preset decibel value, and generate a mono-audio file with preset playing length according to the set natural frequency and the sound intensity.

The detecting module 45 is configured to detect whether the sound outlet hole of the loudspeaker is blocked.

The display module 46 is configured to display a dust removal interface on a display 22 of the terminal device 20 to request to acquire a dust removal instruction of a user.

The re-detecting module 47 is configured to detect whether the sound outlet hole of the loudspeaker is blocked again.

The prompting module 48 is configured to prompt the user to repair the loudspeaker.

As a possible implementation method, the generating module 44 may include a measuring unit 441, a setting unit 442, and a generating unit 443.

The measuring unit 441 is configured to, in a preset current value, exciting currents with various frequencies are inputted to a coil of the loudspeaker to drive a vibration diaphragm of the loudspeaker to vibrate. Air flow is generated in the sound outlet hole under the driving of the vibration diaphragm.

The setting unit 442 is configured to set a frequency of the exciting current, which is inputted to the coil when the vibration amplitude of the vibration diaphragm is at a maximum, as the natural frequency.

The generating unit 443 is configured to generate the audio file for removing dust according to the exciting current at the natural frequency.

The apparatus for removing dust in the sound outlet hole of the loudspeaker in accordance with the present embodiment includes the reading module configured to read a prestored audio frequency for removing dust, and the playing module configured to play the audio file for removing dust. When the loudspeaker plays the audio file for removing dust, the wind speed through the sound outlet hole of the loudspeaker is at a maximum. After the prestored audio file for removing dust is read, the loudspeaker plays the audio file for removing dust, so that the wind speed in the sound outlet hole of the loudspeaker is at a maximum by. As such, the dust deposited in the position of a dust cloth is blown by the air flow, and the manual cleaning process of a user can be avoided, thereby solving the technical problem that the method for removing dust in the sound outlet hole of the loudspeaker is not convenient in the prior art It is noted that the descriptions of the methods in accordance with above-mentioned embodiments are also applied to the apparatus in accordance with the embodiment of the present disclosure. The implementation principles of the methods are similar to those of the apparatus and not repeated herein.

Figure 6:
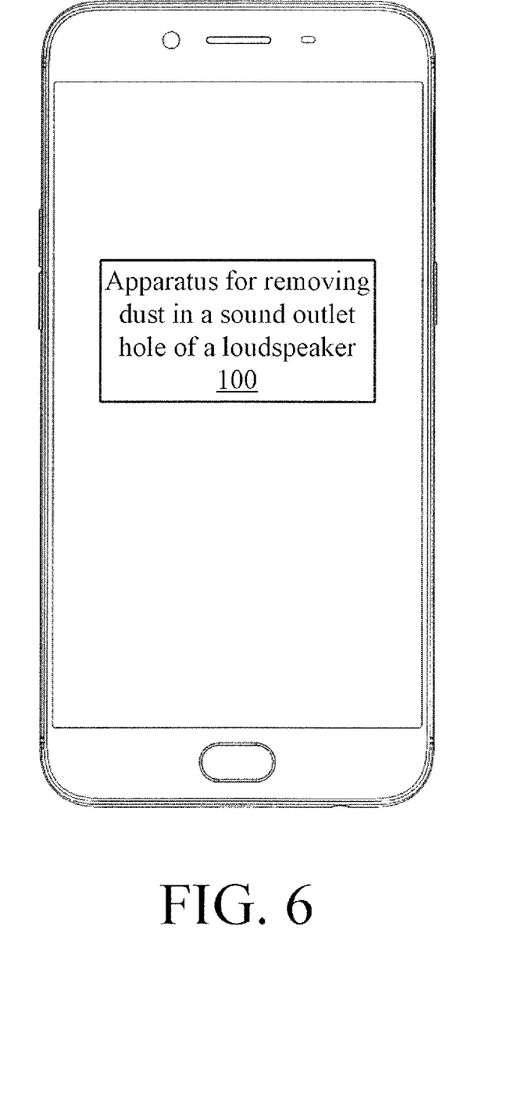
FIG. 6 illustrates a structural diagram of a terminal device in accordance with an embodiment of the present disclosure.

To implement the above-mentioned embodiments, the present disclosure provides a terminal device. FIG. 6 illustrates a structural diagram of a terminal device in accordance with an embodiment of the present disclosure. As shown in FIG. 6, the terminal device includes an apparatus 100 for removing dust in a sound outlet hole of a loudspeaker.

It is noted that the structural diagram of the apparatus 100 for removing dust in the sound outlet hole of the loudspeaker may be referred to FIG. 4 and FIG. 5 in detail. The descriptions of the apparatus for removing dust in the sound outlet hole of the loudspeaker in accordance with above-mentioned embodiments are also applied to the apparatus 100 for removing dust in the sound outlet hole of the loudspeaker in accordance with the embodiment of the present disclosure. The implementation principles of the apparatus in FIG. 4 and FIG. 5 are similar to those of the apparatus 100 and not repeated herein.

In summary, in the terminal device in accordance with the embodiment of the present disclosure, the wind speed in the sound outlet hole of the loudspeaker may be at a maximum by reading the prestored audio file for removing dust and playing the audio file for removing dust via the loudspeaker. As such, the dust deposited in the position of the dust cloth is blown by the air flow, and the manual cleaning process of a user can be avoided, thereby solving the technical problem that the method for removing dust in the sound outlet hole of the loudspeaker is not convenient in the prior art.

Figure 7:
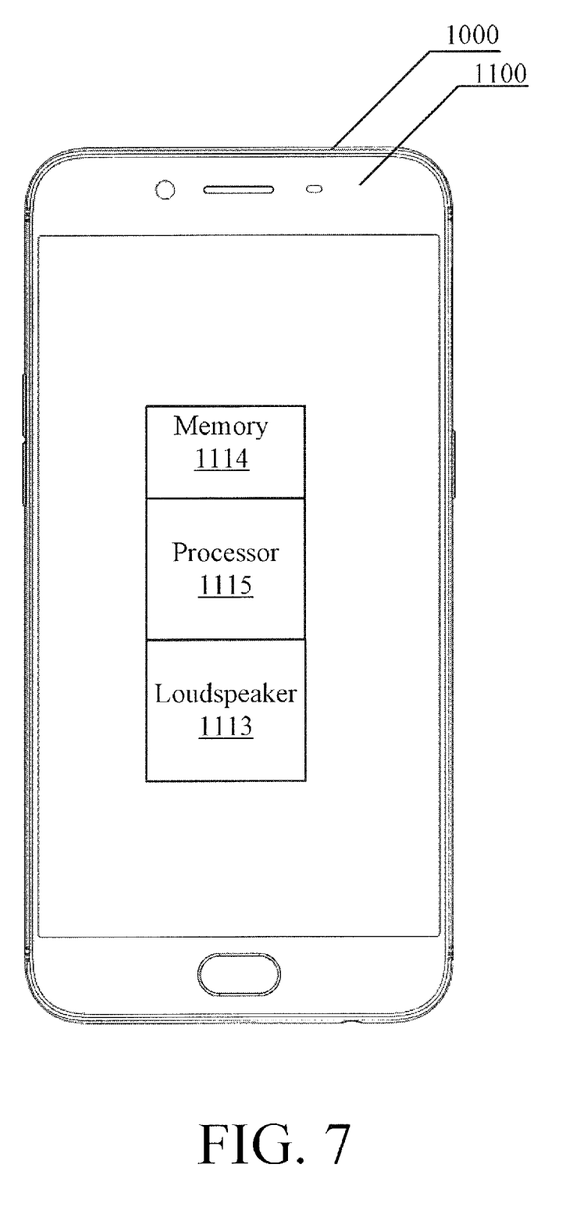
FIG. 7 illustrates a structural diagram of a terminal device in accordance with another embodiment of the present disclosure.

To implement the above-mentioned embodiments, the present disclosure provides another terminal device. FIG. 7 illustrates a structural diagram of a terminal device in accordance with another embodiment of the present disclosure. As shown in FIG. 7, the terminal device 1000 includes a housing 1100, a loudspeaker 1113 disposed in the housing 1100, a memory 1114 disposed in the housing 1100, and a processor 1115 disposed in the housing 1100.

The memory 1114 stores the audio file for removing dust. The processor 1115 is configured to read the audio file for removing dust and control the loudspeaker 1113 to play the audio file for removing dust. When the loudspeaker 1113 plays the audio file for removing dust, the wind speed through the sound outlet hole of the loudspeaker 1113 is at a maximum.

It is noted that the descriptions of the methods in accordance with above-mentioned embodiments are also applied to the terminal device 100 in accordance with the embodiment of the present disclosure. The implementation principles of the methods are similar to those of the terminal device 100 and not repeated herein.

In summary, in the terminal device in accordance with the embodiment of the present disclosure, the wind speed in the sound outlet hole of the loudspeaker may be at a maximum by reading the prestored audio file for removing dust and playing the audio file for removing dust via the loudspeaker. As such, the dust deposited in the position of the dust cloth is blown by the air flow, and the manual cleaning process of a user can be avoided, thereby solving the technical problem that the method for removing dust in the sound outlet hole of the loudspeaker is not convenient in the prior art.

In the description of the specification, reference terminologies "an embodiment", "some embodiments", "an illustrate embodiment", "an example", "a specific example", or "some examples", "some embodiments", "some embodiments", "some embodiments", or "some embodiments" mean that specific features, structures, materials, or characteristics in conjunction with the description of the embodiments or examples are included in at least one of the embodiments or examples. In the specification, the illustrated description of the above-mentioned terminologies is not limited to the same embodiment or example. Moreover, the described specific features, structures, materials, or characteristics may be combined in a proper way in any one or more of the embodiments or examples. For example, blocks S201-S203 in FIG. 3 may be used in FIG. 1. The measuring module 43 and the generating module 44 in FIG. 5 may be used in FIG. 4.

While the embodiments of the present disclosure have been shown and described, it will be understood the above-mentioned embodiments are merely exemplary to explain the present disclosure and not to be construed as limiting the present disclosure. Various changes, modifications, equivalents, and variants may be made by those skilled in the art from the scope of the present disclosure.

What is claimed is:

1. A method for removing dust in a sound outlet hole of a loudspeaker, comprising:
    measuring a natural frequency of the loudspeaker, generating an audio file for removing dust according to the natural frequency, and prestoring the audio file for removing dust;
    reading the prestored audio file for removing dust; and
    controlling the loudspeaker to play the audio file for removing dust, to generate air flow in the sound outlet hole, wherein when the loudspeaker plays the audio file for removing dust, a wind speed of the air flow in the sound outlet hole is at a maximum;
    wherein measuring the natural frequency of the loudspeaker, and generating the audio file for removing dust according to the natural frequency comprises:
        inputting exciting currents having a preset current value and various frequencies to a coil of the loudspeaker, to drive a vibration diaphragm of the loudspeaker to vibrate, wherein the air flow is generated in the sound outlet hole under the vibration of the vibration diaphragm;
        recording a frequency of a first exciting current as the natural frequency of the loudspeaker, when a vibration amplitude of the vibration diaphragm excited by the first exciting current is at a maximum; and
        generating the audio file for removing dust according to the first exciting current having the natural frequency.

2. The method for removing dust in the sound outlet hole of the loudspeaker of claim 1, wherein generating the audio file for removing dust according to the first exciting current having the natural frequency comprises:
    setting a preset playing length for the audio file for removing dust;
    setting a preset sound intensity for the audio file for removing dust; and
    generating a mono-audio file for removing dust according to the first exciting current having the natural frequency, the preset playing length, and the preset sound intensity.

3. The method for removing dust in the sound outlet hole of the loudspeaker of claim 1, further comprising the following prior to the action of reading the prestored audio file for removing dust:
    detecting whether the sound outlet hole of the loudspeaker is blocked;
    displaying a dust removal interface on a display of a terminal device to acquire a dust removal instruction, when the sound outlet hole of the loudspeaker is blocked, wherein the terminal device comprises the loudspeaker; and
    performing the action of reading the prestored audio file for removing dust, when the dust removal instruction is acquired.

4. The method for removing dust in the sound outlet hole of the loudspeaker of claim 3, after playing the audio file for removing dust, the method further comprising:
    detecting whether the sound outlet hole of the loudspeaker is blocked; and
    prompting a user to repair the loudspeaker when the sound outlet hole remains in a blocked state.

5. A non-transitory computer-readable storage medium storing a computer program which, when executed by a processor, causes the processor to:
    measure a natural frequency of a loudspeaker, generate an audio file for removing dust according to the natural frequency, and prestore the audio file for removing dust;
    read the prestored audio file for removing dust; and
    control the loudspeaker to play the audio file for removing dust, to generate air flow in a sound outlet hole of the loudspeaker, wherein when the loudspeaker plays the audio file for removing dust, a wind speed of the air flow in the sound outlet hole is at a maximum,
    wherein the computer program executed by the processor to measure the natural frequency of the loudspeaker and generate the audio file for removing dust according to the natural frequency is executed by the processor to:
        input exciting currents having a preset current value and various frequencies to a coil of the loudspeaker, to drive a vibration diaphragm of the loudspeaker to vibrate, wherein the air flow is generated in the sound outlet hole under the vibration of the vibration diaphragm;
        record a frequency of a first exciting current as the natural frequency of the loudspeaker, when a vibration amplitude of the vibration diaphragm excited by the first exciting current is at a maximum; and
        generate the audio file for removing dust according to the first exciting current having the natural frequency.

6. The non-transitory computer-readable storage medium of claim 5, wherein the computer program executed by the processor to generate the audio file for removing dust according to the first exciting current having the natural frequency is executed by the processor to:
    set a preset playing length for the audio file for removing dust;
    set a preset sound intensity for the audio file for removing dust; and
    generate a mono-audio file for removing dust according to the first exciting current having the natural frequency, the preset playing length, and the preset sound intensity.

7. The non-transitory computer-readable storage medium of claim 5, wherein the computer program executed by the processor further causes the processor to:
    detect whether the sound outlet hole of the loudspeaker is blocked before reading the prestored audio file for removing dust;
    display a dust removal interface on a display of a terminal device to request to acquire a dust removal instruction, when the sound outlet hole of the loudspeaker is blocked, wherein the terminal device comprises the loudspeaker; and
    perform the action of reading the prestored audio file for removing dust, when the dust removal instruction is acquired.

8. The non-transitory computer-readable storage medium of claim 7, wherein the computer program executed by the processor further causes the processor to:

detect whether the sound outlet hole of the loudspeaker is blocked, after playing the audio file for removing dust; and prompt a user to repair the loudspeaker when the sound outlet hole remains in a blocked state.

9. A terminal device, comprising a housing, a loudspeaker disposed in the housing, a memory disposed in the housing, and a processor disposed in the housing, wherein the memory stores an audio file for removing dust, and the processor is configured to:

measure a natural frequency of the loudspeaker, generate an audio file for removing dust according to the natural frequency, and prestore the audio file for removing dust;

read the prestored audio file for removing dust; and control the loudspeaker to play the audio file for removing dust, to generate air flow in a sound outlet hole of the loudspeaker;

wherein when the loudspeaker plays the audio file for removing dust, a wind speed of the air flow through the sound outlet hole is at a maximum;

wherein the processor carrying out the action of measuring the natural frequency of the loudspeaker and generating the audio file for removing dust according to the natural frequency is configured to:

input exciting currents having a preset current value and various frequencies to a coil of the loudspeaker, to drive a vibration diaphragm of the loudspeaker to vibrate, wherein the air flow is generated in the sound outlet hole under the vibration of the vibration diaphragm;

record a frequency of a first exciting current as the natural frequency of the loudspeaker, when a vibration amplitude of the vibration diaphragm excited by the first exciting current is at a maximum; and generate the audio file for removing dust according to the first exciting current having the natural frequency.

10. The terminal device of claim 9, wherein the processor carrying out the action of generating the audio file for removing dust according to the first exciting current having the natural frequency is configured to:

set a preset playing length for the audio file for removing dust;

set a preset sound intensity for the audio file for removing dust; and generate a mono-audio file for removing dust according to the first exciting current having the natural frequency, the preset playing length, and the preset sound intensity.

11. The terminal device of claim 9, wherein the processor is further configured to:

detect whether the sound outlet hole of the loudspeaker is blocked before reading the prestored audio file for removing dust;

display a dust removal interface on a display of the terminal device to request to acquire a dust removal instruction, when the sound outlet hole of the loudspeaker is blocked; and perform the action of reading the prestored audio file for removing dust, when the dust removal instruction is acquired.

12. The terminal device of claim 11, wherein the processor is further configured to:

detect whether the sound outlet hole of the loudspeaker is blocked, after playing the audio file for removing dust, and prompt a user to repair the loudspeaker when the sound outlet hole remains in a blocked state.

* * * * *